United States Patent [19]

Acker

[11] 4,186,292
[45] Jan. 29, 1980

[54] DESK MOUNTED TUBE SEALER

[75] Inventor: Loren C. Acker, Tucson, Ariz.

[73] Assignee: Engineering & Research Associates, Inc., Tucson, Ariz.

[21] Appl. No.: 840,655

[22] Filed: Oct. 11, 1977

[51] Int. Cl.² .......................... H05B 9/04; B32B 19/02
[52] U.S. Cl. ............................. 219/10.81; 219/10.53; 219/10.75; 156/358; 156/380
[58] Field of Search ............... 219/10.81, 10.53, 10.75, 219/243; 156/358, 359, 380, 381, 580

[56] References Cited

U.S. PATENT DOCUMENTS

| 2,629,809 | 2/1953 | Frye | 219/10.53 |
|---|---|---|---|
| 3,040,153 | 6/1962 | Seney | 219/10.53 |
| 3,671,709 | 6/1972 | Gidge | 219/10.53 |
| 3,822,164 | 7/1974 | Guido et al. | 156/358 |
| 3,840,420 | 10/1974 | Sarcia | 156/358 |
| 3,923,588 | 12/1975 | Warthen | 156/380 |
| 4,013,860 | 3/1977 | Hosterman et al. | 219/10.81 |

Primary Examiner—Bruce A. Reynolds
Assistant Examiner—Philip H. Leung
Attorney, Agent, or Firm—Cahill, Sutton & Thomas

[57] ABSTRACT

A desk mounted tubing sealer useable by either seated or standing operators heat seals liquid filled plastic tubing on command. The sealer generates a source of RF energy to heat seal plastic tubing on placement thereof between a fixed jaw and a tube compressing movable jaw. The jaws and attendant structure serves as a heat sink to dissipate heat and prevent a heat buildup during rapid repetitive operation of the sealer. Adequate space and drainage are provided about the operating components for cleaning purposes in the event of a burst tube during formation of a seal.

11 Claims, 9 Drawing Figures

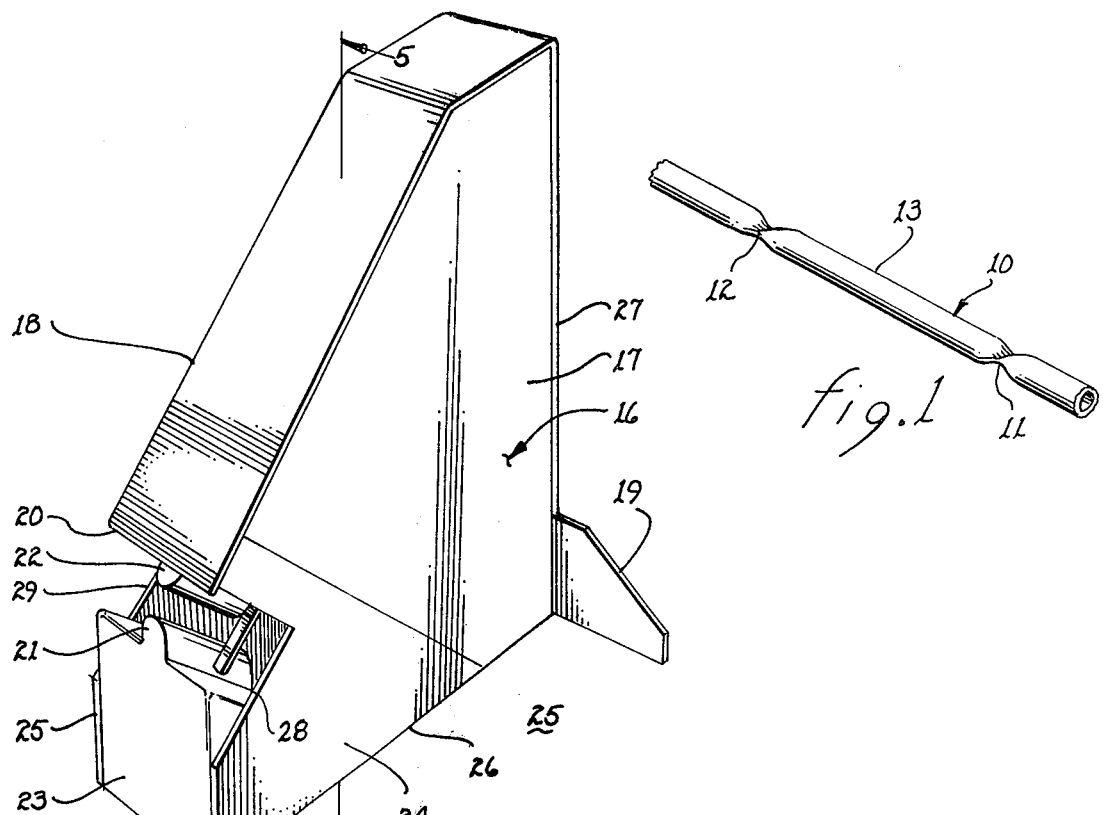
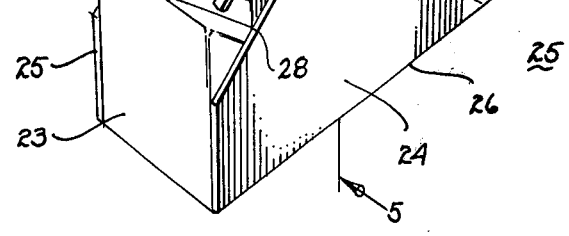
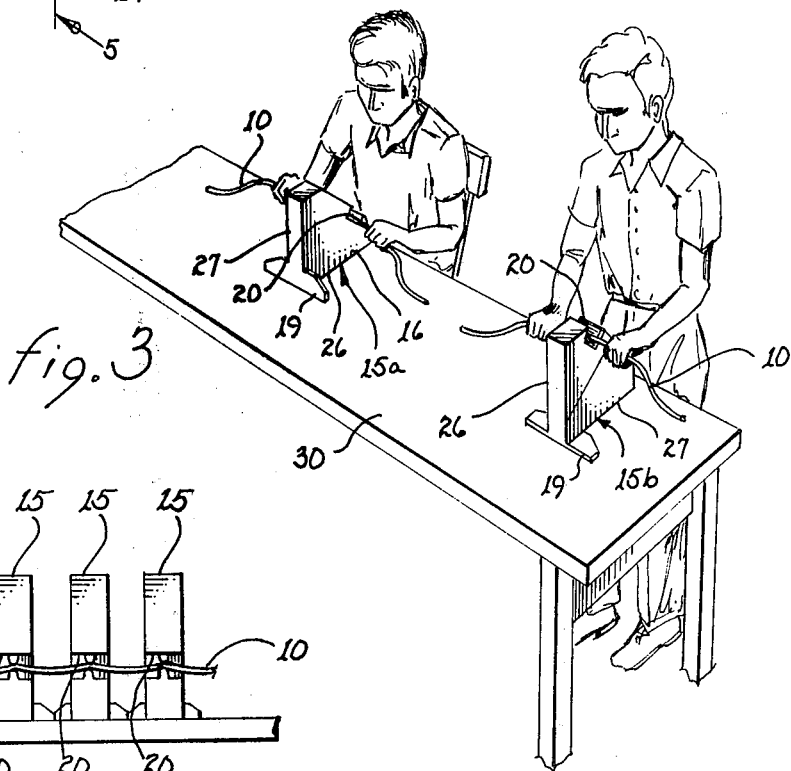
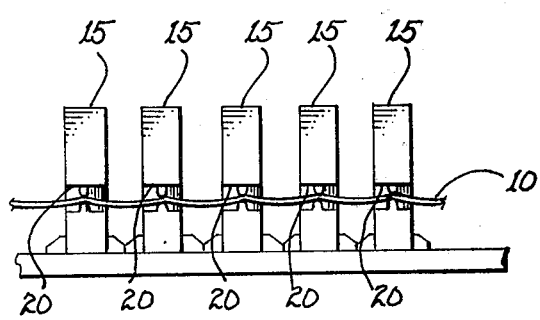

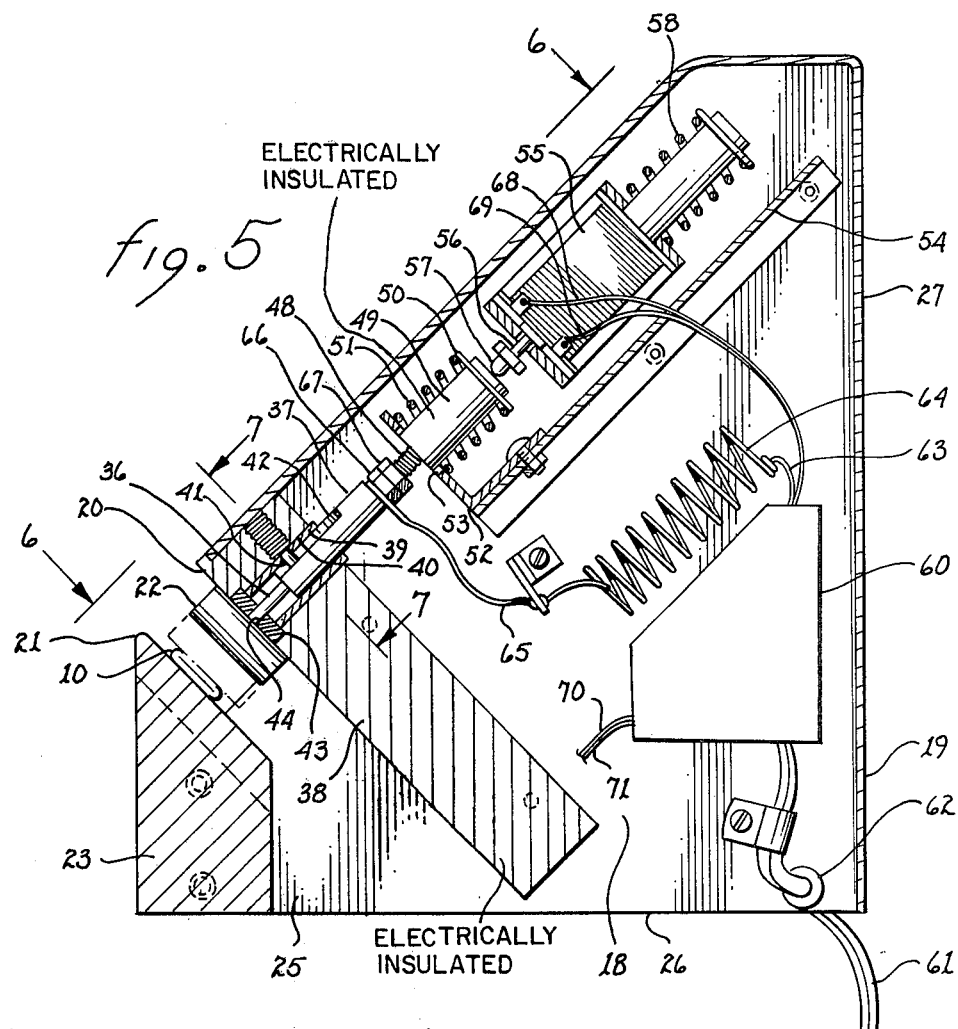
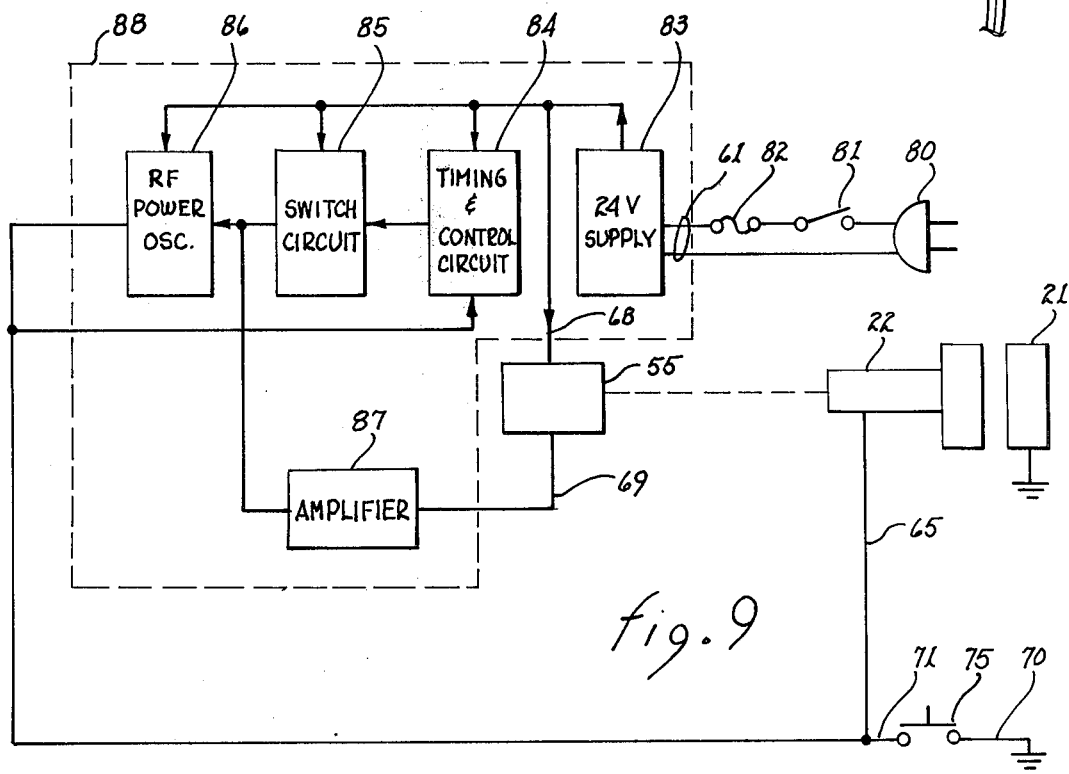

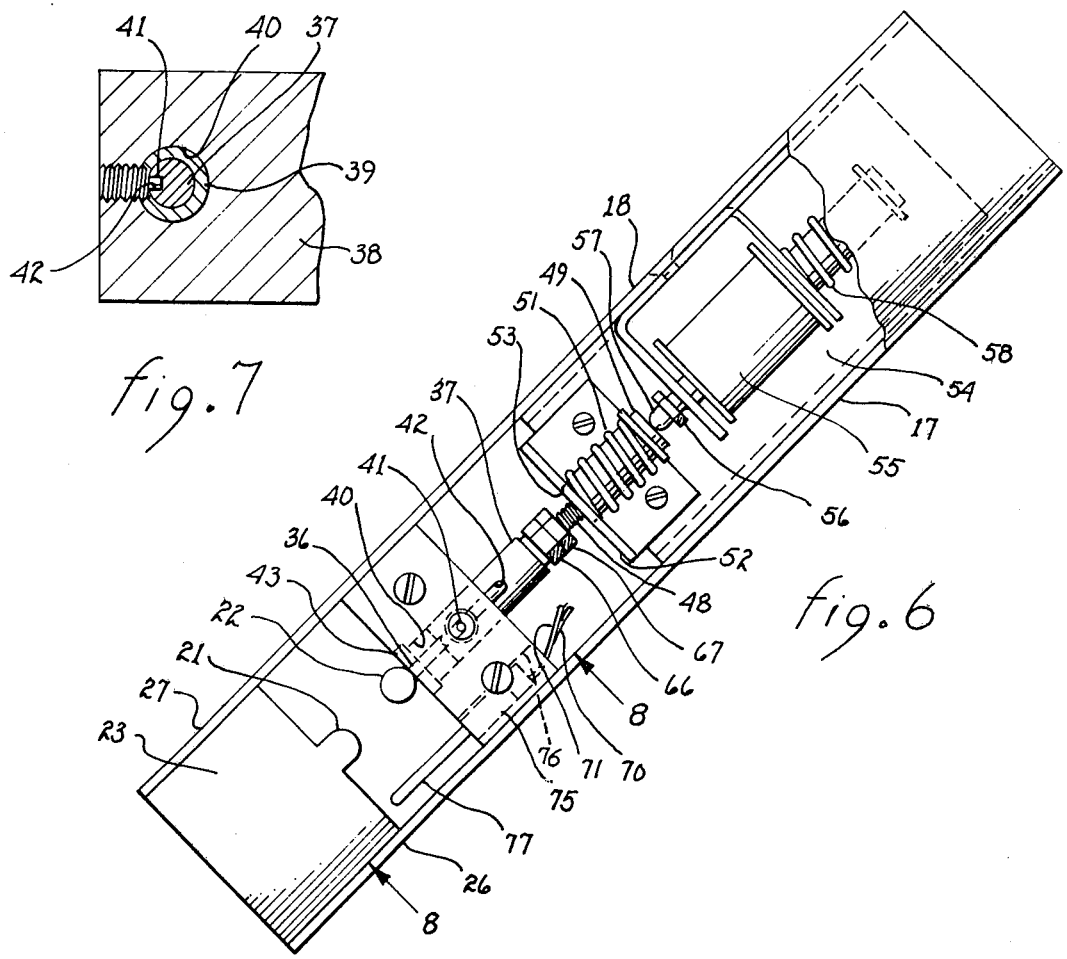
fig. 7
fig. 6
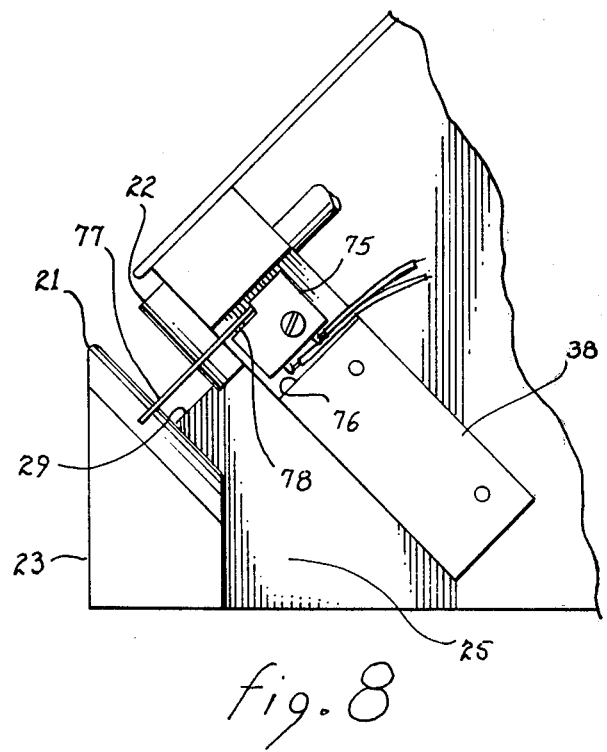
fig. 8

DESK MOUNTED TUBE SEALER

The present invention relates to heat sealers and, more particularly, to desk mounted heat sealers for liquid filled tubing.

The collection of blood from donors is a critical function performed in all towns, cities, and metropolitan areas as the need for fresh blood and plasma by hospitals never diminishes. Consequently, various blood collection centers have been established at permanent locations and mobile blood collection units are employed to service remote areas or to obtain blood from donors at specific high density locations such as shopping centers, factories, office buildings etc.

The process for collecting blood is a relatively simple process with respect to the donor's participation. However, the means for storing and preserving the collected blood requires relatively sophisticated techniques and equipment to minimize loss from contamination or spoilage.

U.S. Pat. No. 4,027,735, entitled "Blood Mixing and Weight Monitoring Apparatus" assigned to the present assignee, describes a device for collecting a predetermined weight of blood within a collection bag containing a premeasured quantity of preservative. In addition, the device includes a mechanism for clamping the tubing through which the blood flows into the collection bag. As a unit, this device is presently widely used and contains all of the equipment necessary to collect the blood within the collection bag and temporarily clamp the tubing attached to the bag until the tube is permanently sealed.

To meet the need for readily and easily sealing blood filled plastic tubing, a hand held operated tubing sealer has been developed and is described in U.S. Pat. No. 4,013,860 entitled "Hand Held Electro Mechanical Sealer", assigned to the present assignee. This sealer is a readily transportable sealer of small size and it is hand operated to form heat seals in any plastic tubing placed intermediate its jaws. Thus, it is readily useable to form seals at the donor prior to withdrawing the needle and maintaining a sterile closed system. Also, a plurality of sealed segregated compartments along a length of tubing filled with blood can be completed, wherein each of the compartments is identified with a common serial number. Thereafter, the compartments may be segregated from one another and various tests may be performed upon the sample of blood contained in the compartments. This capability is particularly important where testing is necessary and yet maintenance of the seal for the blood within the attendant collection bag is not to be disrupted or broken.

At most blood collection centers, such as those operated by the Red Cross, much of the manual labor is performed as charitable work by older persons. These persons often are physically handicapped by the natural processes of aging, by arthritis or by previous injuries. For those persons whose hands are not strong or who suffer pain when they attempt to grip an article with their hands, the above described hand held sealer is difficult or painful to use. Consequently, the rate or production of seals is substantially slower than optimum.

The desk mounted sealer described herein is useable by an operator who is either seated or standing and it provides a direct line of sight for the operator in either position. Thereby, operator fatigue is diminished and accurate positioning of the liquid filled tubing to be automatically sealed is promoted. Through actuation of a tubing position sensing switch or a foot operated switch, a seal will be effected in the tubing placed intermediate a fixed and a moveable jaw, thereby allowing the operator to use one or both hands to repetitively place and reposition the tubing intermediate the jaws. The housing for the sealer sealingly encloses the operative elements to preclude seepage of fluid thereinto from a burst liquid filled length of tubing. The shaft supporting the movable jaw and extending from within the housing is sealed through a wiping seal. The jaws themselves and the attendant structure are developed from large mass heat conducting material to dissipate the heat generated by the jaws and preclude heat buildup for the benefit of both the operator and the integrity of the formed seals.

It is therefore a primary object of the present invention to provide a compact multi-positionable desk mounted sealer for sealing tubing.

Another object of the present invention is to provide a desk mounted sealer for plastic tubing which does not require manual operation of the active elements.

Still another object of the present invention is to provide a desk mounted sealer wherein the operation of the sealing jaws are viewable by the operator.

Yet another object of the present invention is to provide a compact desk mounted sealer useable as a single unit or as one of a gang of units to simultaneously produce a multiplicity of sealed segregated compartments.

A further object of the present invention is to provide heat dissipation apparatus for a desk mounted sealer to permit rapid repetitive seals without excessive heat buildup.

A still further object of the present invention is to provide a desk mounted sealer which is readily cleanable and is not detrimentally affected by burst liquid filled tubing.

A yet further object of the present invention is to provide non-critical mechanisms for positioning a movable jaw of a desk mounted tubing sealer while initiating timely generation of RF energy fo effect a heat seal in the tubing.

These and other objects of the present invention will become apparent to those skilled in the art as the description thereof proceeds.

The present invention may be described with greater specificity and clarity with reference to the following drawings, in which:

FIG. 1 illustrates a length of a typical liquid filled plastic tubing having a plurality of spaced apart seals or welds formed therein;

FIG. 2 is a perspective view of a desk mounted sealer;

FIG. 3 illustrates the versatility in positioning the desk mounted sealer illustrated in FIG. 2;

FIG. 4 is a frontal view illustrating a plurality of ganged tube sealers;

FIG. 5 is a cross-sectional view of the tube sealer taken along lines 5—5, as shown in FIG. 2;

FIG. 6 is a top view taken along lines 6—6, as shown in FIG. 5;

FIG. 7 is a cross-sectional view taken along lines 7—7, as shown in FIG. 5;

FIG. 8 is a side view taken along lines 8—8, as shown in FIG. 6; and

FIG. 9 is a block diagram of a representative circuit for generating the RF energy.

Referring to FIG. 1, there is shown a length of tubing 10, which may be similar to the plastic tubing employed in conjunction with blood collection bags. This tubing is of a composition which permits the formation of a seal or weld, such as welds 11 and 12 in the presence of heat after the tubing has been squeezed. By the formation of a plurality of transverse welds across a length of liquid filled tubing, a plurality of segregable compartments 13 are obtained. Each of these compartments may subsequently be used to test the liquid therein or otherwise analyze or store the samples of the liquid. When the contained liquid is blood, each of compartments 13 is generally identified by a coded number or other designation to mate the blood filled collection bag with the blood samples contained in each of the compartments.

FIG. 2 is a perspective view of a desk mounted sealer 15. The sealer includes a housing 16 having generally triangular sides 17 and 18. The width of the sealer is relatively thin, on the order of 1½ to 2½ inches. To prevent sideways tipping of the sealer, a stand 19 extends laterally from sides 17 and 18; as illustrated, stand 19 may be of a length of sheet material, the central portion of which forms part of the enclosure defining housing 16. The lower front portion of housing 15 includes a cutout section 20 to provide lateral as well as vertical access intermediate fixed jaw 21 and movable jaw 22 disposed within the cutout section. A block 23 of heat and RF energy conducting material, which may be integral to fixed jaw 21, and is attached to housing 16 through forwardly extending sections 24 and 25 of housing 16. A passageway extends downwardly from cutout section 20 intermediate sections 24 and 25 whereby drainage of fluid from the fixed and movable jaws is readily effected in the event of spillage; moreover, this passageway, in combination with the cutout section, affords sufficient room for the cleaning of any spilled fluid.

Referring to FIG. 3, two desk mounted sealers 15a and 15b are illustrated in different modes of use. Desk mounted sealer 15a is shown oriented for use by a person in a seated position. Herein, the edge of stand 19 rests against table 30 and, in combination with the base of housing 16, provides a stable T-shaped support for the sealer. Cutout section 20, containing the fixed and movable jaws, is in general alignment with the operator's line of vision such that he/she may readily view the placement of tubing 10 intermediate the jaws and view the actual sealing operation of the jaws. It may be noted that both of the operator's hands may be used to grasp the tubing on either side of sealer 15a to position and maintain the tubing in place during the sealing operation. Moreover, without changing the grip on the tubing, the tubing may be moved laterally in either direction and a plurality of welds and intermediate compartments may be easily formed.

Tube sealer 15b is supported upon table 30 by planar side of stand 19 and rear edge 27 of the sealer; it may be noted that herein the sealer is also supported by a stable T-shaped support which prevents tipping or tilting of the sealer during use. In the position illustrated for sealer 15b, cutout section 20 is in general alignment with the standing operator's line of sight. Accordingly, he/she can readily view the placing of tubing 10 intermediate the fixed and movable jaws and can watch their operation to insure the formation of an effective weld transverse to the tubing. Moreover, opposed ends of the tubing may be grasped and without altering one's grip on the tubing, multiple welds can be made to form segregable liquid filled compartments in the tubing.

For mass production operations or wherein a plurality of welds must be developed, a plurality of desk mounted sealers can be used in ganged fashion, as illustrated in FIG. 4. Herein, each of sealers 15 are placed adjacent one another at a distance commensurate with the length of the compartments to be formed within tubing 10. It may be noted that each of cutout sections 20 are in general alignment with one another such that a straight length of tubing 10 can be inserted simultaneously intermediate the fixed and movable jaws of each sealer. On actuation of a foot operated switch, or similar device, all of the sealers are simultaneously, or in any other order, actuated to form the requisite welds within the tubing. Although sealers 15 are shown oriented in the configuration depicted by sealer 15a in FIG. 3, it is to be noted that the orientation may equally easily be that depicted by sealer 15b.

Turning now to FIGS. 5, 6, 7 and 8, the structural features of the components embodied within the sealer will be described. Block 23, is attached to sides 17 and 18 by machine screws or by bolts extending from one side to the other side through the block. Fixed jaw 21 may be formed as part of block 23 or as a separate element rigidly secured to the block by welding, machine screws, etc. Movable jaw 22 is supported by a shaft 36 extending from a cylindrical member 37. A block 38 of electrically insulating material defines one side of cutout section 20 as well as one side of the passageway extending through housing 16 intermediate sections 24 and 25. A sleeve 39, disposed within a passageway 40 extending through block 38 provides a bearing and supporting surface for movable cylindrical member 37. As noted in the drawings, fixed jaw 21 is semicylindrical in cross-section; similarly, movable jaw 22 is at least semicircular in cross-section and may be cylindrical, as illustrated. To maintain fixed jaw 21 and movable jaw 22 in longitudinal alignment with one another for a proper radiation pattern of RF energy therebetween, a threaded pin 41 extends from block 38 into passageway 40 to slidably mate with a longitudinally oriented slot 42 disposed within the surface of cylindrical member 37. Thereby, reorientation of movable jaw 22 about the axis of shaft 36 is precluded. A wiping seal 43 is lodged within an annular groove about the front end of passageway 40. A centrally located aperture 44 within the seal circumferentially engages shaft 36. By forming aperture 44 with a diameter less than that of shaft 36, flexing of the seal with a resulting wiping action upon the shaft will occur each time movable jaw 22 is translated along the axis of shaft 36.

A threaded shaft 48 extends rearwardly from cylindrical member 37 and supports a further cylindrical member 49. A washer 50 is attached to the rear of cylindrical member 49 to maintain a spring 51 under compression intermediate the washer and a side wall 52 internal to housing 16. The function of spring 51 is that of maintaining movable jaw 22 generally adjacent block 38 during non-actuation periods of the sealer. An aperture 53 is disposed within side wall 52 to accommodate movement of cylindrical member 49 along the axis of shaft 36.

Actuation of movable jaw 22 is effected through electrically energized solenoid 55. The solenoid includes a spring loaded plunger 56 having a threadedly adjustable end piece 57. Upon actuation of the solenoid, plunger 56 will be translated toward fixed jaw 21 and upon contact with the end of cylindrical member 49, translates, via cylindrical member 37 and shaft 36, movable jaw 22 toward the fixed jaw. On deenergization of solenoid 55, spring 58 will retract plunger 56 and spring 51, disposed about cylindrical member 49, will bear against washer 50 to retract movable jaw 22.

The extended position of movable jaw 22, indicated by the phantom lines, can be precisely controlled by means of threaded shaft 48 with respect to cylindrical member 49 and/or by the extension or retraction of end piece 57 with respect to plunger 56. Thus, exact and repetitive extension of movable jaw 22 is readily easily effected. It may also be noted that since the solenoid plunger and the shaft for the movable jaw are not mechanically interconnected, substantial misalignment therebetween is possible without deteriorating the operation of the movable jaw and without causing binding. Thereby, relatively inexpensive solenoids with relatively low quality bearings may be employed.

The solenoid and its operating mechanism may be segregated within housing 16 by side wall 52 and side wall 54 bearing against sides 17 and 18 of the housing.

The circuitry employed in the present invention for effecting transmission of RF energy intermediate movable jaw 22 and fixed jaw 21 and which RF energy results in heating and partial melting of tubing 10 may be of the type disclosed and described in the earlier identified U.S. Pat. No. 4,013,860. This circuitry, is housed within compartment 60. The power to the circuit is provided by power cord 61 extending into housing 16 through grommet 62. The output of the circuitry includes an electrical conductor 63 connected to a RF coil 64. The other end of the coil is electrically connected through electrical conductor 65 to cylindrical member 37 and retained in place by means of nuts 66 and 67 threadedly engaging shaft 48. A pair of electrical conductors 68 and 69 extend from within compartment 60 to electrically actuate coil of solenoid 55. Selective energization of the circuit within compartment 60 may be effected through a foot operated switch (not shown) as discussed above, or by means of a miniature switch 75 responsive to placement of tubing 10 intermediate fixed jaw 21 and movable jaw 22. Whichever type of switch is employed, the switch is electrically connected to the circuitry within compartment 60 through electrical conductors 70 and 71.

Miniature switch 75 may be mounted within a cavity 76 disposed within block 38; alternatively, the miniature switch may be located exterior of housing 16. Arm 77, pivotally attached to the miniature switch is pivotally responsive to downward movement of tubing 10 intermediate fixed jaw 21 and movable jaw 22. Pivotal movement of the arm brings the arm to bear against pin 78 to electrically connect electrical conductors 70 and 71 with one another and thereby close the circuit within compartment 60.

To properly position tubing 10 intermediate the fixed and movable jaws, upper edges 28 and 29 of sections 24 and 25 serve as supports below which the tubing cannot be forced. The location of miniature switch 75 is selected such that arm 77 is vertically positioned in relation to edges 28 and 29 whereby full downward pivotal movement of the arm results upon resting of the tubing against the edges. Thereby, on insertion of tubing 10 intermediate the fixed and movable jaws, the circuit within compartment 60 is energized. On energization, solenoid 55 is actuated to force the movable jaw toward the fixed jaw. Simultaneously, a time based burst of RF energy is generated and transmitted through electrical conductor 63, coil 64, electrical conductor 65, cylindrical member 37, and shaft 36 to movable jaw 22. The return path for the generated RF energy is through jaw 21 and sections 24 and 25, which are electrically conducting.

On positioning of the movable jaw adjacent to but not in contact with the fixed jaw, tubing 10 will be squeezed (as indicated in FIG. 5) to bring the interior opposing surfaces adjacent one another. A burst of RF energy of a predetermined value is then transmitted from the movable jaw to the fixed jaw through the tubing. Tubing 10 presents a resistance to the RF energy transmitted therethrough resulting in the development of sufficient heat to partially melt or soften the tubing and weld the opposing tubing surfaces to one another. As stated in further detail in the above identified U.S. Pat. No. 4,013,860, the initial transmission of RF energy through the tubing during compression of the tubing results in some heating of the tubing and provides greater compliancy by the tubing into the squeezed configuration illustrated in FIG. 5.

After a predetermined time period, the circuit within compartment 60 terminates the generation of RF energy, the tubing is allowed to cool and solenoid 55 is deenergized. Upon deenergization of the solenoid, the movable jaw is retracted and tubing 10 may be removed. The heat generated during the welding operation as well as the slight heating of the jaws themselves is rapidly and effectively dissipated through block 23 which serves as a heat sink. Additionally, sections 24 and 25, being of aluminum or similar heat transmission material, readily dissipates the heat to housing 16 and the ambient air. Accordingly, except for a slight temperature rise of no concern to either the tubing or the operator, continuous and rapid welding operations may be undertaken indefinitely.

FIG. 9 illustrates a representative circuit in block format for effecting actuation of the movable jaw and the heating and welding of the tubing disposed intermediate the jaws. An electrical plug 80 is connected to a source of electrical power, such as a conventional 110 volt AC circuit. An on-off switch 81, supplies power through fuse 82 to power supply circuit 83. The power supply circuit provides a source of 24 volt DC power to timing and control circuit 84, switching circuit 85 and RF power oscillator 86; additionally, power to solenoid 55 is provided from the 24 volt supply through electrical conductor 68. On closing of miniature switch 75, the timing and control circuit 84 is energized to provide commands to switching circuit 85, which commands result in the flow of power to solenoid 55 through amplifier 87; additionally, RF energy is supplied to movable jaw 22 from RF power oscillator 86. As described in more detail in U.S. Pat. No. 4,013,860, after a predetermined time period controlled by the timing and control circuit, transmission of RF energy is terminated and solenoid 55 is deenergized, resulting in retraction of movable jaw 22 from a position adjacent but separated from fixed jaw 21. The circuit within dashed line 88 is generally representative of the circuit contained within compartment 60, as illustrated in FIG. 5.

While the principles of the invention have now been made clear in an illustrative embodiment, there will be immediately obvious to those skilled in the art many modifications of structure, arrangement proportions, elements, materials, and componenets, used in the practice of the invention which are particularly adapted for specific environments and operating requirements without departing from those principles.

I claim:

1. A desk mounted sealer for sealing heat weldable tubing, said sealer comprising in combination:
   a. a housing having top, bottom, front and rear sides of substantially less width than the length and breadth of opposed lateral sides;
   b. a stand extending laterally from the opposed lateral sides of said housing for supporting said housing in combination with either of two sides of said housing;
   c. a passageway extending through said housing from one side of said housing to another side of said housing, two opposed surfaces of said passageway being defined by the opposed lateral sides of said housing;
   d. a cutout section disposed within the opposed lateral sides in proximity to the upper end of said passageway;
   e. heat sink means disposed intermediate the opposed lateral sides and defining another surface of said passageway;
   f. a fixed jaw extending from said heat sink means into said passageway in proximity to said cutout section;
   g. block means disposed intermediate the opposed lateral sides and defining a further surface of said passageway;
   h. a movable jaw journalled within said block means for compressing the tubing against said fixed jaw, said movable jaw being reciprocally translatable from said block means toward said fixed jaw and into general alignment with said fixed jaw and return;
   i. electrically actuated means for effecting translation of said movable jaw;
   j. circuit means for generating a source of RF energy;
   k. conductor means for transmitting the RF energy from said circuit means to said movable jaw; and
   l. switch means for energizing said electrically actuated means and said circuit means;

whereby, on placement of the tubing adjacent said fixed jaw and upon actuation of said switch means, the tubing is compressed intermediate said fixed jaw and said movable jaw and RF energy is transmitted from said movable jaw through the tubing to said fixed jaw to heat and seal the tubing with a weld.

2. The sealer as set forth in claim 1 wherein said electrically actuated means comprises a solenoid having a spring loaded plunger.

3. The sealer as set forth in claim 2 wherein said movable jaw is disposed within said passageway, said movable jaw including a shaft extending internal to said housing through said block means in general longitudinal alignment with the axis of operation of said solenoid.

4. The sealer as set forth in claim 3 wherein said shaft includes an end bearing against but not coupled to the plunger of said solenoid.

5. The sealer as set forth in claim 4 including bearing means for supporting said shaft within said block means.

6. The sealer as set forth in claim 5 further including seal means for sealing said shaft.

7. The sealer as set forth in claim 6 wherein said switch means is disposed within said passageway in proximity to said cutout section.

8. The sealer as set forth in claim 7 wherein said switch means includes an actuating arm responsive to insertion of the tubing intermediate said fixed jaw and said movable jaw.

9. The sealer as set forth in claim 8 wherein said circuit means is disposed within said housing.

10. The sealer as set forth in claim 1 wherein said laterally opposed sides include a 90 degree corner in proximity to said stand.

11. The sealer as set forth in claim 10 wherein said housing is supported in a first position by said stand and a side of said housing and in a second position by said stand and another side of said housing and wherein said second position is rotatably offset from said first position through an angle of 90 degrees.

* * * * *